(12) United States Patent
Santoso

(10) Patent No.: US 11,522,936 B2
(45) Date of Patent: Dec. 6, 2022

(54) SYNCHRONIZATION OF LIVE STREAMS FROM WEB-BASED CLIENTS

(71) Applicant: salesforce.com, inc., San Francisco, CA (US)

(72) Inventor: Nicholas Indra Santoso, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/245,889

(22) Filed: Apr. 30, 2021

(65) Prior Publication Data

US 2022/0353313 A1 Nov. 3, 2022

(51) Int. Cl.
*H04L 29/06* (2006.01)
*H04L 65/75* (2022.01)
*H04L 65/65* (2022.01)
*H04L 65/70* (2022.01)

(52) U.S. Cl.
CPC .............. *H04L 65/75* (2022.05); *H04L 65/65* (2022.05); *H04L 65/70* (2022.05)

(58) Field of Classification Search
CPC .... H04L 65/601; H04L 65/607; H04L 65/608
See application file for complete search history.

(56) References Cited

U.S. PATENT DOCUMENTS

| | | | | |
|---|---|---|---|---|
| 5,953,049 A | * | 9/1999 | Horn | H04N 21/4341 348/E7.083 |
| 7,394,833 B2 | * | 7/2008 | Heikkinen | G10L 19/167 704/E19.048 |
| 7,551,647 B2 | * | 6/2009 | Fellman | H04J 3/0638 370/503 |
| 10,225,814 B2 | * | 3/2019 | Atti | H04S 7/00 |
| 2004/0042601 A1 | * | 3/2004 | Miao | H04M 3/567 379/202.01 |
| 2009/0088880 A1 | * | 4/2009 | Thapa | H04N 7/15 709/204 |
| 2012/0050456 A1 | * | 3/2012 | Arnao | H04N 7/152 348/14.12 |
| 2015/0077509 A1 | * | 3/2015 | Ben Natan | G10L 19/173 348/14.09 |

* cited by examiner

*Primary Examiner* — Esther B. Henderson
*Assistant Examiner* — Nazia Naoreen
(74) *Attorney, Agent, or Firm* — Holland & Hart LLP

(57) ABSTRACT

Methods, apparatuses, and computer program products for synchronization of live streams from web-based clients are disclosed. The method may include transmitting, to a plurality of clients broadcasting a plurality of media streams, an instruction to reproduce a synchronization signal. The method may include receiving, via the plurality of media streams, a plurality of recordings of the synchronization signal. The method may include determining one or more delays associated with the plurality of media streams based at least in part on the plurality of recordings of the synchronization signal. The method may include adjusting a timing of one or more of the plurality of media streams to synchronize the plurality of media streams, the adjusting based at least in part on the received plurality of recordings and the determined one or more delays. The method may include re-encoding the plurality of media streams into a combined stream.

18 Claims, 11 Drawing Sheets

SYNCHRONIZATION OF LIVE STREAMS FROM WEB-BASED CLIENTS

FIELD OF TECHNOLOGY

The present disclosure relates generally to database systems and data processing, and more specifically to synchronization of live streams from web-based clients.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

Synchronization of live streams from multiple participants involves several technical challenges. This may be due to the large amount of latency that occurs in the stream from each client, which may arise from various sources, including inherent latency in an internet connection, processing latency at each client's machine, or other sources, any or all of which may vary across different clients. These delays are disruptive to multiple live streams that need to be synchronized. For example, in a musical context, such delays make synchronized musical performance nearly impossible. Further, the various streams in current teleconferencing tools cannot be guaranteed to start, stop, or perform other actions at synchronized points in time due to the asynchronous nature of today's web technology.

DETAILED DESCRIPTION

Figure 1:
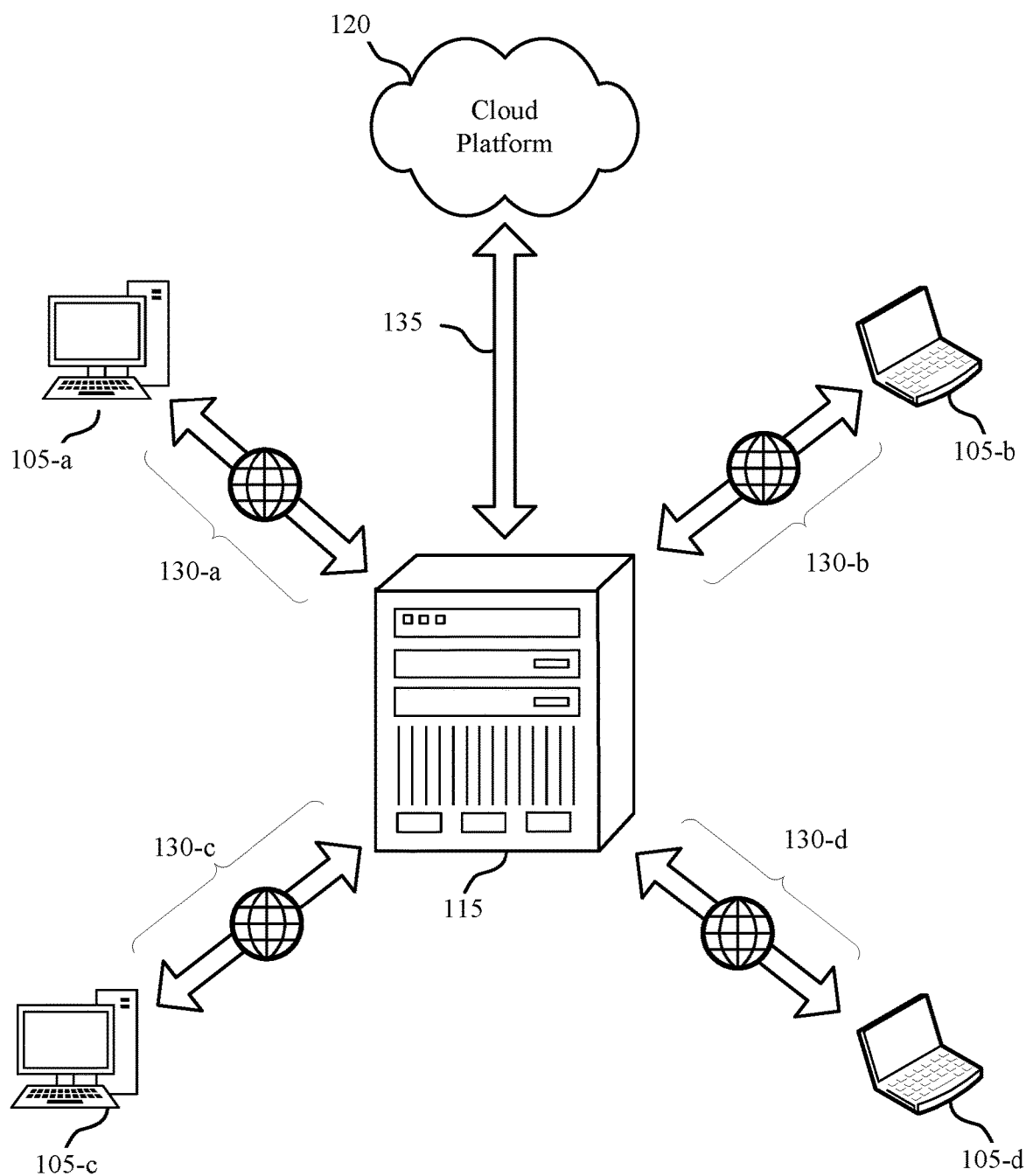
FIG. 1 illustrates an example of a media stream synchronization at an application server system that supports synchronization of live streams from web-based clients in accordance with aspects of the present disclosure.

The approaches disclosed herein may synchronize live streams (which may also be referred to as media streams) or compensate for latency and asynchronous operation of live streaming by utilizing a web-based application associated with an application server. The application server may signal the clients to playback a synchronization signal that may be received by the same audio signal path that may be used for the stream (e.g., the synchronization signal may be played back as an audio signal through headphones and recorded by a microphone, preamp, analog-to-digital converter (ADC), and may also be subjected to processing that may be used to capture the musical performance), thus accounting for any client-specific delays introduced by the audio signal path (e.g., delays due to processing, analog-to-digital conversions, etc.).

The application server may receive a stream from each client and extract a portion thereof containing a recording of the synchronization signal, from which the individual delay for each client may be calculated. The application server may determine one or more delays associated with the various streams. Then, each stream may be adjusted in time based on the individual delay for that stream such that the various streams are synchronized. Then, each stream may be mixed and re-encoded into a single stream. In this way, the approaches described herein may resolve a technical problem present in teleconferencing or live streaming situations, in that latency or delays present in the network may make precise synchronization of the various streams difficult or impossible.

In some examples, the synchronization signal may be a modulated pseudo-random periodic signal with an auto-correlation peak. In some examples, the application server may synchronize reproduction of the synchronization signal at each of the clients. In some examples, the delay may be calculated by performing a cross-correlation of the extracted portion and the synchronization signal, and comparing the location of the peak of each cross-correlation to determine the delay (also referred to as a phase or angle) of each stream. In some examples, one or more of the various streams may be adjusted in time based on a reference stream, which may have the shortest delay of the various streams. In some examples, the application server may also transmit an instruction to one or more of the clients to reproduce a temporal reference signal. In some examples, the application server may synchronize reproduction of such a temporal reference signal at one or more of the clients. In some examples, the single, combined stream may be transmitted to a streaming service for transmission to an audience, or the application server itself may offer the stream directly to an audience.

Aspects of the disclosure are initially described in the context of a networked system. Aspects of the disclosure are further described by system diagrams, an example delay determination, and a process flow. Aspects of the disclosure are further illustrated by and described with reference to apparatus diagrams, system diagrams, and flowcharts that relate to synchronization of live streams from web-based clients.

FIG. 1 illustrates an example of a system 100 for computing that supports synchronization of live streams from web-based clients in accordance with various aspects of the present disclosure. The system 100 may include cloud clients 105, server 115, and a data center. Server 115 may be an example of a public or private cloud network. A cloud client 105 may access server 115 over public network connections 130. The network may implement transfer control protocol and internet protocol (TCP/IP), such as the Internet, or may implement other network protocols. A cloud client 105 may be an example of a user device, such as a server, a smartphone, or a laptop. In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with the server 115. The interactions may include transmission of streams, reception of streams, synchronization of streams, administration of the server 115, or any other interaction between a cloud client 105 and a server 115. Data may be associated with the interactions. A cloud client 105 may access server 115 to store, manage, and process the data associated with the interactions. In some cases, the cloud client 105 may have an associated security or permission level. A cloud client 105 may have access to applications, data, and database information within server 115 based on the associated security or permission level, and may not have access to others. In some examples, a cloud client 105 may be coupled to an audio input device, an audio output device, or both. In some examples, a cloud client 105 may also be coupled to a video input device (e.g., a camera, a capture card, or other video input device). In some examples, a cloud client 105 may transmit a stream using an audio input device, a video input device, or both. In some examples, a cloud client 105 may monitor one or more streams from another cloud client 105 via an audio output device.

Server 115 may offer an on-demand database service to the cloud client 105. In some cases, server 115 may be an example of a multi-tenant database system. In this case, server 115 may serve multiple cloud clients 105 with a single instance of software. However, other types of systems may be implemented, including—but not limited to—client-server systems, mobile device systems, and mobile network systems. In some cases, the cloud client 105 may develop applications to run on server 115. Server 115 may be implemented using remote servers. In some cases, the remote servers may be located at one or more data centers.

Server 115 may also be connected to cloud platform 120. Server 115 may be connected to the cloud platform 120 via a network connection 135, which may be either a public or a private network connection. The cloud platform 120 may be an example of a multi-tenant database system. The cloud platform 120 may support the operations of the server 115 (e.g., provide data processing, data storage, or both). In some examples, the cloud platform 120 may directly serve one or more cloud clients 105.

In some examples, the system 100 may include a subsystem. The subsystem may include cloud clients 105, server 115, and cloud platform 120. In some examples, the subsystem may include one or more data centers. In some cases, data processing may occur at any of the components of subsystem, or at a combination of these components. In some cases, servers may perform the data processing. The servers may be a cloud client 105 or located at a data center. In some examples, cloud clients 105 may communicate with the server 115 over a public network connections 130 (e.g., the internet) to implement or carry out the approaches described herein.

In some examples, the cloud clients 105 may transmit a live stream via the public network connections 130 to the server 115 for synchronization of the live streams. The server 115 may transmit, to the cloud clients 105, an instruction to reproduce a synchronization signal. The server 115 may receive one or more recordings of the synchronization signal from one or more of the clients. The server 115 may receive these recordings via the live streams. The server 115 may determine one or more delays associated with one or more live streams based on the recordings of the synchronization signal, and may adjust a timing of one or more of the live streams to synchronize one or more of the live streams based on the recordings and the delays. The server 115 may re-encode, reformat, transcode, combine, or otherwise process the live streams. In some examples, the server 115 may combine the live streams into a combined stream, which, in some examples, may be transmitted to a streaming service.

In some approaches to teleconferencing or live streaming with multiple streams, the multiple streams are often not synchronized due to delays or latency. The delays or latency may be present because a cloud client 105 may be transmitting a live stream via a public network connection 130, which may have delays or latency. In addition, the delays or latency that each cloud client 105 may experience may not be the same across different cloud clients 105, public network connections 130, or both. The asynchronous operation of many web operations and processing also makes synchronization across multiple cloud clients 105 and public network connections 130 more difficult. For example, web-browsers may not have real-time execution capabilities used for timestamping audio/video, timing of media recording, and timing of media playback. As such, recording or playing media (e.g., a live stream) with deterministic timing becomes difficult. For example, delays of 500 ms or more may not be uncommon, and such delays make synchronized musical performance across multiple streams difficult or impossible.

In addition to network delays or latency, each cloud client 105 may also have different amounts of processing or other local delays or latency present at each cloud client 105, further complicating the delay and latency problems. These and other sources of delay or latency make synchronizing the various live streams from the cloud clients 105 quite difficult.

The approaches detailed herein utilize a synchronization signal that each cloud client 105 may reproduce when directed by the server 115. This synchronization signal may be recorded into live streams, and the server may receive the live streams with the synchronization signal present in the live streams. Based on this signal, the server 115 may determine a delay for each live stream, based on which the server 115 may adjust timings of the live streams to synchronize the live streams, and may re-encode or combine the various live streams into a single stream.

For example, if a user at a cloud client 105-*a* wishes to transmit a musical performance along with users at cloud clients 105-*b*, 105-*c*, and 105-*d*, each user at each cloud client 105 may connect or interface with the server 115 to utilize the approaches described herein. In some examples, a user may access a web application hosted by or associated with the server 115 that may implement the approaches described herein. For example, each user may begin a live stream at their respective cloud client 105 devices. The server 115 may instruct the cloud clients 105 to playback the synchronization signal in a synchronized way, so that all of the synchronization signals are being played back simultaneously. The server 115 may receive the various live streams in which the users have recorded the synchronization signal by any acceptable method (e.g., through a microphone, direct playback through an audio interface, or other method of capturing and transmitting the synchronization signal). Based on these recordings, the server 115 may determine a delay or latency (both of which may also be referred to as a phase or angle), and may adjust a timing of one or more of the live streams to synchronize the live streams. Further, the server 115 may instruct the cloud clients 105 to reproduce a temporal reference signal (e.g., a click track, a backing track, or other type of temporal reference signal) so that all of the users may perform to the reference track. In this way, each user may perform according to the same reference track that may be synchronized across the various cloud clients 105 by the server 115 or by other approaches. In addition, since the server 115 is measuring and compensating for the delays or latencies present in each of the cloud clients' 105 signal path (e.g., from the performer, through a local cloud client's 105 machine, through a public network connection 130, and to the server 115), the various live streams will be synchronized for an audience to enjoy.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
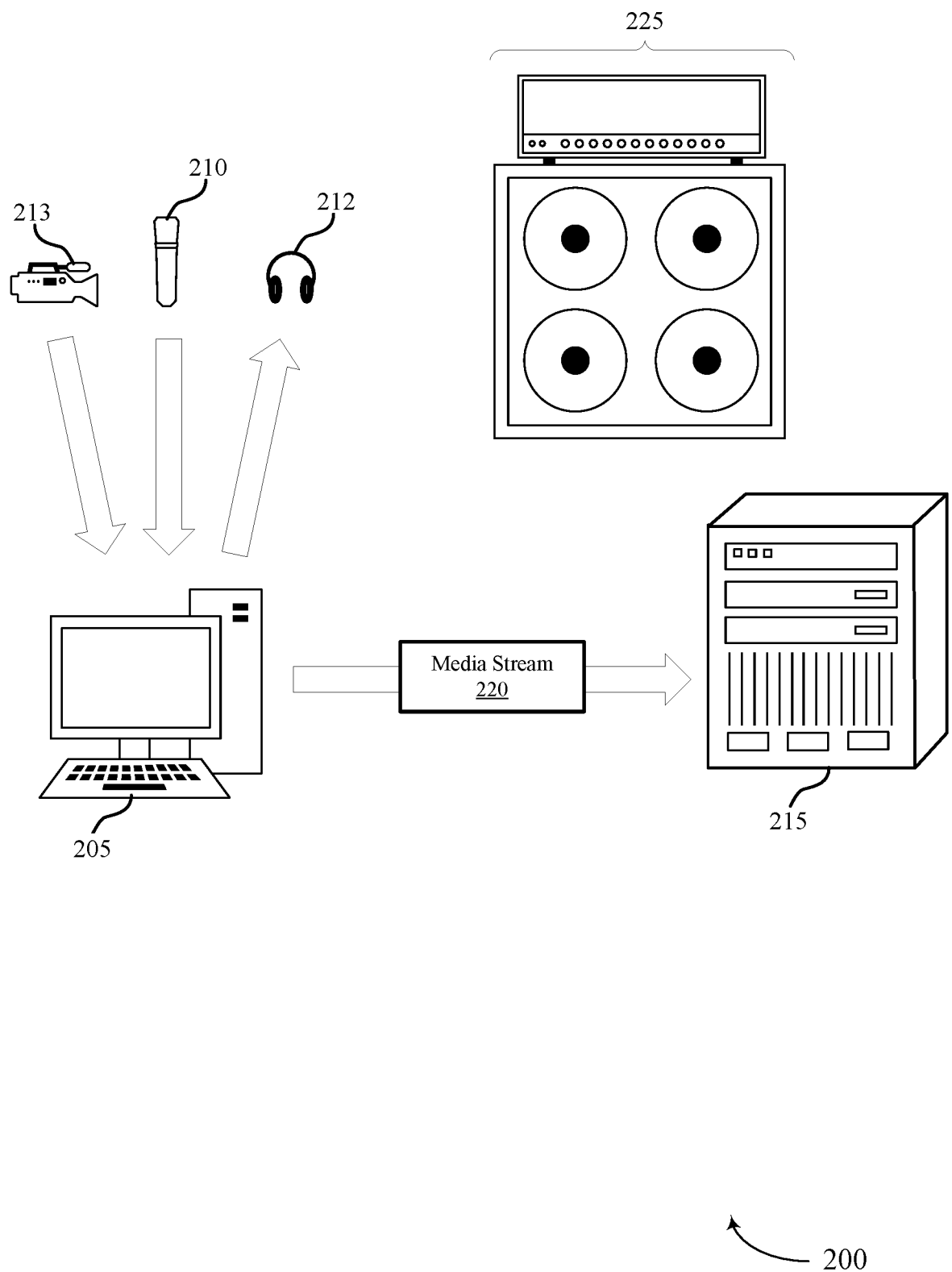
FIG. 2 illustrates an example of a diagram of a system that supports synchronization of live streams from web-based clients in accordance with aspects of the present disclosure.

FIG. 2 illustrates an example of a diagram of a system 200 that supports synchronization of live streams from web-based clients in accordance with aspects of the present disclosure. The system 200 may include a client 205 and a server 215. The client 205 may be connected to various elements used for creating a media stream 220. For example, the client 205 may be connected or coupled to an audio input device 210 (e.g., a microphone, an audio interface, or other audio input device) for capturing audio for the media stream 220. The client 205 may be connected or coupled to an audio output device 212 (e.g., headphones, speakers, or other audio output device). The client 205 may be connected or coupled to a video input device 213 (e.g., a camera, a capture card that may receive one or more video signals, or another video input device).

A user at the client 205 may wish to participate in a group musical performance, a group business presentation, a live entertainment broadcast, or other group media stream to an audience. In some examples, such a group media stream may also be used for recording purposes, and may be played back at a later date or time. The media stream 220 may include audio captured by the audio input device 210, video captured by the video input device 213, other information captured or produced by the client 205, or any combination thereof. For example, the user may capture video, audio, other information, or a combination thereof of a stream element 225. As a further example, in a musical performance the user may capture sound from a guitar amplifier to perform with other musicians using approaches described herein. In addition, the client 205 may have additional media to be transmitted in the media stream 220 (e.g., visual aides for a business presentation, lyrics or a musical score for a musical performance, or other information). This additional media may also be synchronized with other elements of the media stream 220 using approaches described herein.

In some examples, a user may initiate the start of a media stream (e.g., media stream 220). In some examples, other users also participating in the group stream may capture, with an input device (e.g., audio input device 210), the output of an output device (e.g., audio output device 212, which may be one or more speakers, headphones, or other audio output devices). Though examples with audio are provided herein, other examples are also contemplated. For example, other users may place a camera to capture a video output of a monitor, for example.

In some examples, the server 215 may signal to all clients to playback a synchronization signal through the output device (e.g., the audio output device 212) that may be captured by the input device (e.g., the audio input device 210). Each of the clients (e.g., client 205) may reproduce the synchronization signal, and may do so in real time. In some examples, playback of synchronization signal is synchronized, in some cases after a time period (e.g., 1000 ms). In some examples, the input device may capture the output of the output device that is reproducing the synchronization signal, thereby including the capture of the synchronization signal in the media stream.

In some examples, the clients (e.g., client 205) may start transmitting media streams 220 to the server 215. Such live streams or media streams 220 may include audio, video, other elements, or a combination thereof. The server 215 may then receive the media streams (e.g., media stream 220) from all users, and the server may extract the captured synchronization signal from each media stream. In some examples, the server 215 may signaled to the clients to stop playback of the synchronization signal. In some examples, the users may be instructed to longer capture the output of the output device with the input device. For example, the server 215 (or a user) may notify or prompt each user to remove the microphone from the position used to capture the synchronization signal from a set of headphones or a speaker, so that the users may position their microphones for use during the media stream.

In some example, the server 115 may use the audio extracted from each stream and a copy of the sync track, to determine a delay each stream has with respect to each other. In some examples, each media stream (e.g., media stream 220) may be adjusted in time (e.g., fast-forwarded) by their respective delay −d, where d is the delay of the stream with the smallest delay. The server 115 may then be mixed and re-encoded before streaming to a broadcasting service.

In some examples, a user may select a temporal reference signal (e.g., a click track) for all participants to use in the group stream. The server 115 may (in some examples in response to the user selection of the temporal reference signal) instruct the clients to load a temporal reference signal to use during the stream. For example, in a musical group, each performer may play along with the click track reproduced at the respective clients. In some examples, a user may indicate to the server 215 to start the temporal reference signal. In some examples, the server 215 may instruct the clients to reproduce the temporal reference signal, and each client may begin to reproduce the temporal reference signal in synchronization. Each of the users or performers may then use the temporal reference signal to begin performing or presenting (e.g., perform the musical piece) accordingly. In some examples, a user may signal to the server 215 to stop the live stream, and all streams may be closed including the one to the streaming service.

Figure 3:
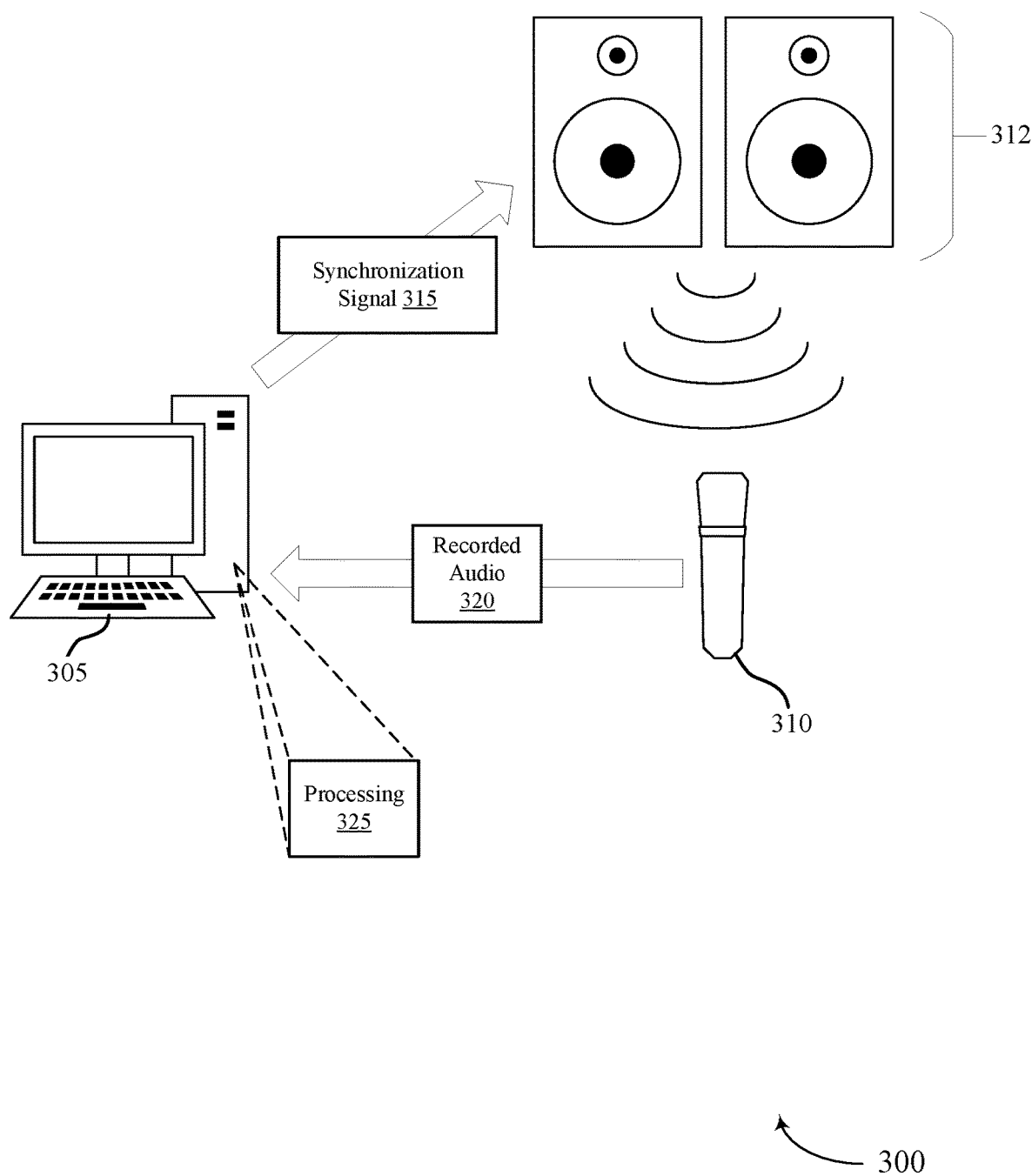
FIG. 3 illustrates an example of a diagram of a system that supports synchronization of live streams from web-based clients in accordance with aspects of the present disclosure.

FIG. 3 illustrates an example of a diagram of a system 300 that supports synchronization of live streams from web-based clients in accordance with aspects of the present disclosure. The system may include a client 305, which may be an example of a cloud client 105 or client 205 as discussed herein. The system 300 may include an audio input device 310 (e.g., a microphone) that may be an example of audio input device 200 as described herein. The system may include an audio output device 312 (e.g., speakers or headphones) that may be an example of audio output device 212 described herein.

To account for the delays from the beginning of the signal path to the audio (including all intervening steps), a server (e.g., the server 215 or server 115 described herein) may indicate to the client 305 to begin reproducing the synchronization signal 315. In some examples, synchronization signals 315 reproduced across various clients (e.g., client 305) may be synchronized. For example, the synchronization signals 315 may be reproduced in a synchronous manner across various clients by playing all the selected audio asynchronously on all connected clients, and then stochastically increasing or decreasing the playback speed of each client until they are all in sync. In some examples, the synchronization signal 315 is captured by the audio input device 310 (e.g., microphone, pickup, audio interface, or other audio input device). In this way, not only can the delays or latency present at the 305 and in private and public network connections be detected and mitigated, but any delays or latencies present at the client 305 (e.g., client specific processing delays or other latency) may also be taken into account. For example, in audio contexts, it is common to use an ADC to convert an analog audio signal to a digital audio signal. Such conversion may introduce latency into the signal path from performer to audience. In addition, presenters, musicians, or other users may use additional equipment to perform, present, or otherwise operate a media stream, which may introduce additional delays or latency. By capturing the synchronization signal, the entire signal path including the user, input devices, clients, processing, private and public networks, may be accounted for, and a group media stream including various individual streams may be synchronized.

In some examples, the synchronization signal 315 may be reproduced through the audio output device 312. In some examples, the synchronization signal 315 may be a modulated signal, pseudo-random signal, a periodic signal, a signal with an auto-correlation peak, a sinusoidal signal, or any combination thereof. In some examples, the synchronization signal 315 may be generated with modulation, such as on-off keying. In some examples, the synchronization signal 315 may include a signal that may be repeated a number of times. In some examples, the length of the synchronization signal 315 may be determined based on an estimated delay (e.g., an estimate delay of one or more of the media streams). In some examples, the synchronization signal 315 may be based on a measured delay.

In some examples, the user may be instructed (e.g., through a notification or prompt at the client 305) to capture the synchronization signal 315 that is being reproduced through the audio output device 312 (or other output device, such as a video device). As described herein, by capturing the synchronization signal 315 through the audio input device 310 (or other input device) and create the recorded audio 320 (or recorded video or other signal), more or all aspects of delay or latency may be measured and compensated for. For example, the recorded audio 320 may be processed by the client 305 with processing 325. Such processing 325 may include analog-to-digital conversion, effects processing, processing related to the operation of the client 305, processing related to the generation of a media stream to transmit to a server for synchronization, additional processing, or any combination thereof. Since the synchronization signal 315 is captured in the recorded audio 320 (or other captured signal that includes a capture of the synchronization signal 315 as reproduced through an output device), additional delays or latency may be captured or measured so that they may be compensated for.

Figure 4:
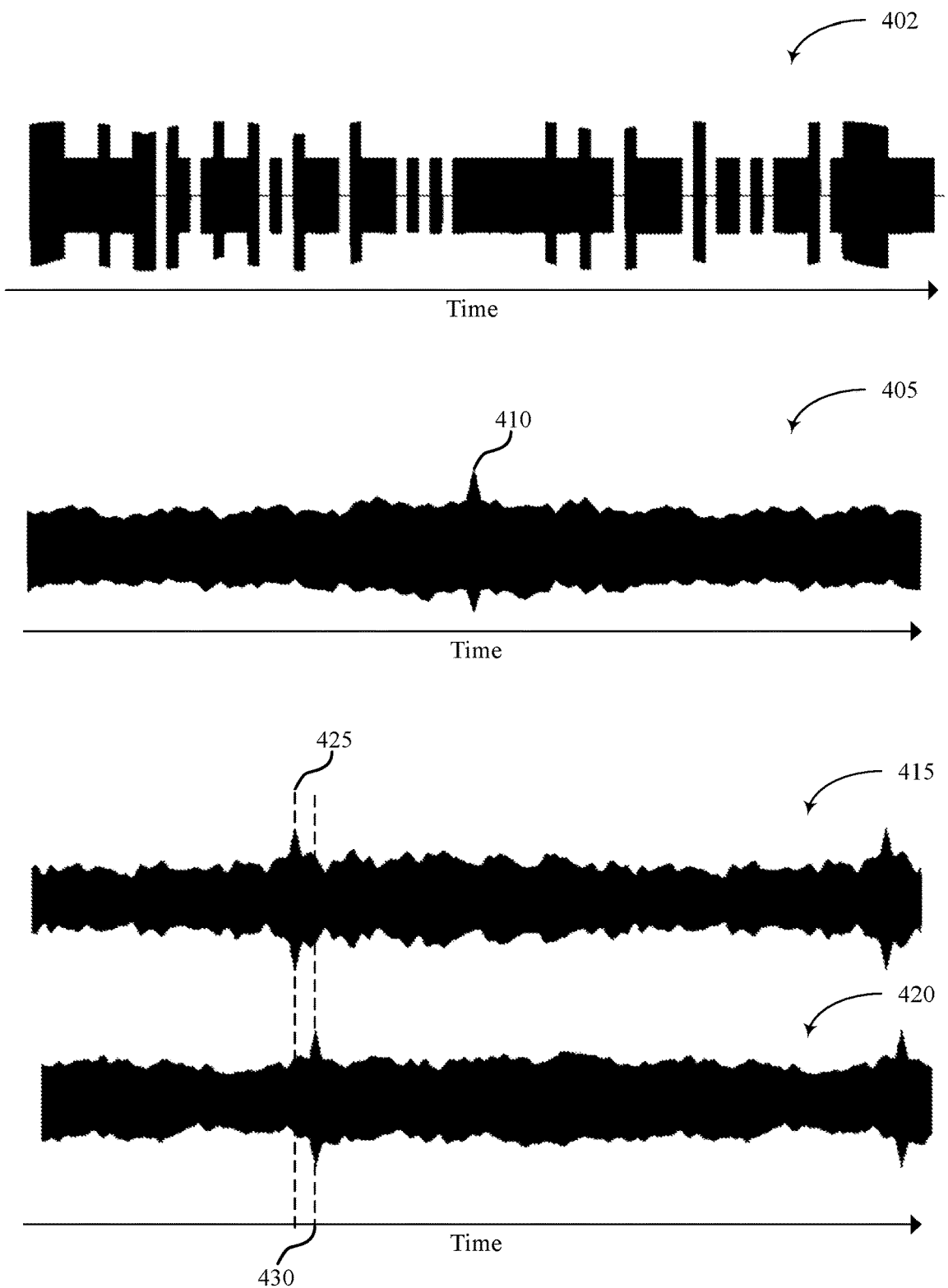
FIG. 4 illustrates an example of delay determination that supports synchronization of live streams from web-based clients in accordance with aspects of the present disclosure.

FIG. 4 illustrates an example of delay determination that supports synchronization of live streams from web-based clients in accordance with aspects of the present disclosure. FIG. 4 includes examples of various waveforms that may be used for the delay determination.

The synchronization signal 402 may be representative of an example synchronization signal that may be used as described in relation to the approaches discussed herein. For example, synchronization signal 402 may be a depiction of one example of synchronization signal 315 described herein. In some examples, the synchronization signal may be a signal such that, given a random subsequence of the synchronization signal (e.g., as captured in a media stream as described herein), the location/index of the random sample in the synchronization signal may be inferred. In some examples, the synchronization signal 402 may be a pseudo random signal which has the property of having a peak autocorrelation at 0. In some examples, the synchronization signal 402 may be of a length that ensures that more than one local maximum point may not be found during a cross-correlation operation. In some examples, the synchronization signal 402 may be generated by modulating a carrier signal with a pseudo random sequence. In some examples, multiple modulated carrier signals may be combined to generate the synchronization signal 402. In some examples, the synchronization signal 402 may be periodic. Utilizing a periodic signal may allow an application server, client, or other implementation of the approaches described herein to use any or every portion of the synchronization signal 402 to find a maximum correlation between the original synchronization signal 402 and a capture of the synchronization signal 402 that is affected by delays or latency.

The autocorrelation waveform 405 may be an example of a waveform that is a result of an autocorrelation operation performed on a synchronization signal (e.g., synchronization signal 402). The autocorrelation waveform 405 may include an autocorrelation peak 410. The autocorrelation peak 410 may represent the point at which the synchronization signal may be most similar to itself. In some examples, the autocorrelation waveform 405 may have a peak autocorrelation at 0 (e.g., the autocorrelation peak 410 may be located at 0 in the autocorrelation waveform 405).

In some examples, given a random subsequence of the synchronization signal 402 (e.g., as captured through a user signal chain as described with reference to FIG. 3 and elsewhere herein), a delay, shift, or phase may be inferred by computing a correlation between the captured signal with the original synchronization signal 402 and identifying a location of the peak.

For example, the first user waveform 415 may be representative of a capture of a synchronization signal (e.g., the process described in relation to FIG. 3 whereby a synchronization signal, such as synchronization signal 315 is captured through an entire signal path to measure delays or latency) that may have been cross-correlated with the original synchronization signal 402. The second user waveform 420 may be representative of a capture of the same synchronization signal used in relation to the first user waveform 415 that may also have been cross-correlated with the original synchronization signal 402. However, the second user may experience different delays or latency when providing a media stream. As such, the second user waveform 420 may exhibit a different delay or latency (or other characteristics) when compared to the first user waveform 415.

In some examples, the location of the peak of each cross-correlation may be located. The location of each peak may then represent an amount of delay for a particular stream. For example, the first user cross-correlation peak 425 may represent an amount of delay or latency for a first client, and the second user cross-correlation peak 430 may represent an amount of delay or latency for a second client. In some examples, the measured locations of cross-correlation peaks may be converted into a phase or angle measurement with respect to the first half of the sync signal. In some examples, the phase of each stream may be converted to units of time, which may denote the amount of delay that each stream may have.

In some examples, each of the streams may be synchronized by adjusting a timing of one or more of the streams. For example, each stream may be advanced in time by its respective delay minus the delay of the stream with the smallest delay. In some examples, it may not be necessary to find an absolute delay value for each stream. Rather, the relative delay between each stream and the stream with the smallest delay may be determined in order to synchronize all the streams. For example, and as shown in FIG. 4, the two streams associated with the first user waveform 415 and the second user waveform 420 may have started at slightly different times. To synchronize these streams, each stream may be advanced (e.g., fast-forwarded) by its respective delay minus the delay of the stream with the smallest delay. For example, if the first stream associated with the first user waveform 415 has a smallest day of 1.788 sec, the first stream may be advanced by 1.788−1.788=0 seconds. If the second stream has a delay of 1.875 seconds, the second stream may be advanced by 1.875−1.788=0.087 seconds. In this way, the multiple streams may be synchronized, despite variances in delay or latency across multiple clients.

Figure 5:
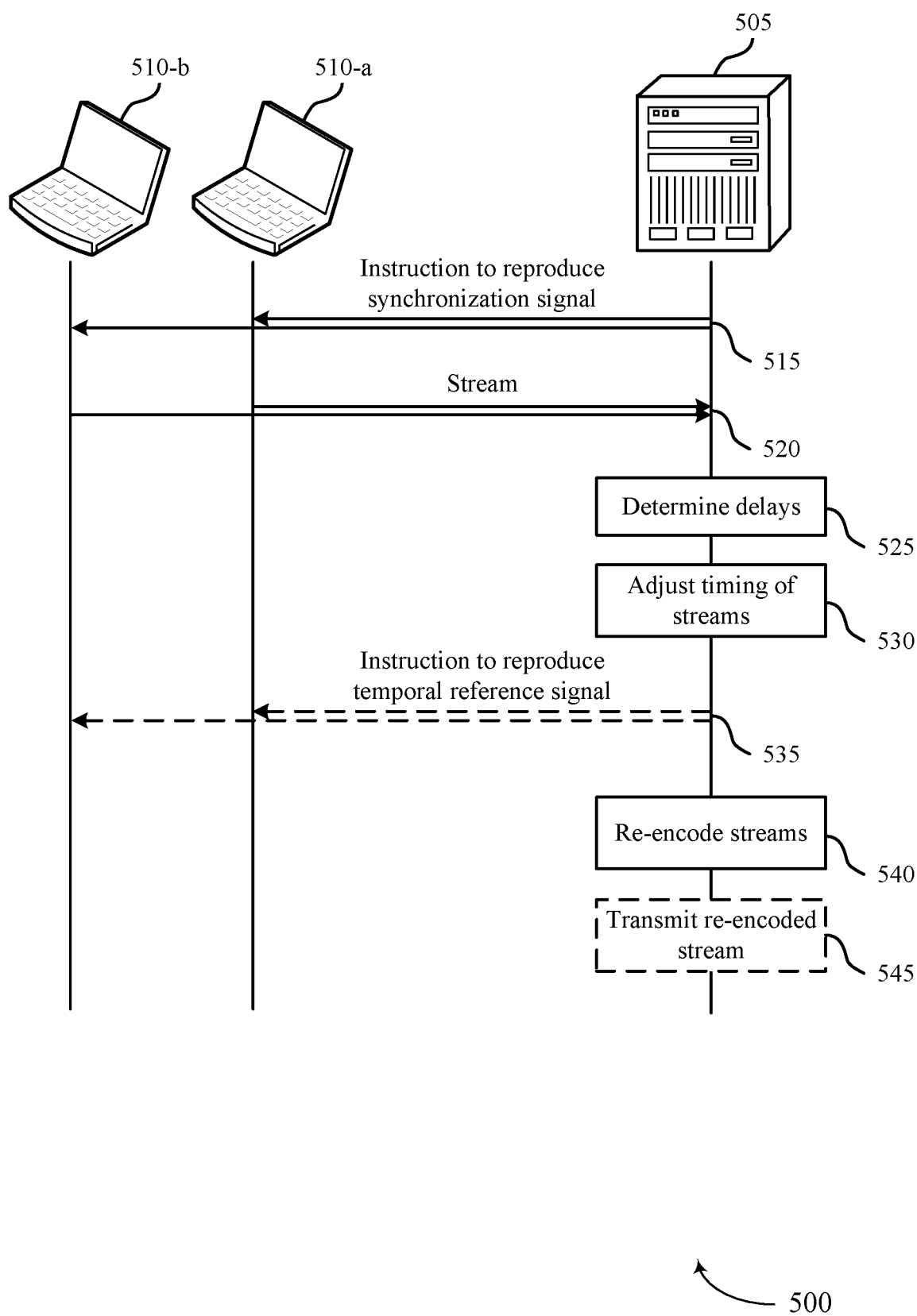
FIG. 5 illustrates an example of a process flow that supports synchronization of live streams from web-based clients in accordance with aspects of the present disclosure.

FIG. 5 illustrates an example of a process flow 500 that supports synchronization of live streams from web-based clients in accordance with aspects of the present disclosure. The process flow 500 may implement various aspects of the present disclosure described with reference to FIGS. 1-4. The process flow 500 may include clients 510 which may be examples of cloud clients 105, client 205, or client 305, as described with reference to FIGS. 1-4. The process flow 500 my include server 505, which may be an example of server 115 or server 215 described in relation to FIGS. 1-4. In some examples, the server 505 may be configured with one or more parameters for synchronizing multiple media streams.

In the following description of the process flow 500, the operations between the various elements may be performed in different orders or at different times. Some operations may also be left out of the process flow 500, or other operations may be added. Although the clients 510 and the server 505 are shown performing the operations of the process flow 500, some aspects of some operations may also be performed by one or more other wireless devices.

At 515, the server 505 may transmit, to a plurality of clients (e.g., clients 510-a and 510-b) broadcasting a plurality of media streams, an instruction to reproduce a synchronization signal. In some examples, the synchronization signal may be a modulated pseudo-random periodic signal with an auto-correlation peak (e.g., the synchronization signal discussed in relation to FIGS. 2-4). In some examples, the server 505 may synchronize reproduction of the synchronization signal at each of the clients 510.

At 520, the server 505 may receive, via the plurality of media streams, a plurality of recordings of the synchronization signal. For example, as discussed in relation to FIGS. 1-4, the server 505 may collect or receive the various media streams from the various clients, and the media streams may contain one or more captures of the synchronization signal, as described in relation to FIGS. 2-4.

At 525, the server 505 may determine one or more delays associated with the plurality of media streams based on the plurality of recordings of the synchronization signal. In some examples, the server 505 may perform a cross-correlation operation between the synchronization signal and one of the plurality of recordings of the synchronization signal to produce a cross-correlation. For example, as discussed in relation to FIG. 4, the synchronization signal (e.g., synchronization signal 402) may be cross correlated with a recording of the synchronization signal (e.g., captured as described in relation to FIGS. 1-4). In some examples, a server 505 may determine a location of a peak of the cross-correlation relative to a location of the auto-correlation peak. For example, as described in relation to at least FIG. 4, a peak (e.g., first user cross-correlation peak 425 or second user cross-correlation peak 430) may be located. In some examples, such location may be performed in relation to a location of the auto-correlation peak, or it may be performed independently of such a location of an auto-correlation peak. In some examples, the plurality of clients 510 may be distributed across a public network and connected to the server 505 via the public network. In some examples, the one or more delays may be attributable to latency present in the public network, a processing delay at each of the clients, or a combination thereof.

At 530, the server 505 may adjust a timing of one or more of the plurality of media streams to synchronize the plurality of media streams, the adjusting based on the received plurality of recordings and the determined one or more delays. For example, as described herein in relation to FIG. 4, a server may advance or fast-forward one or more of the streams to synchronize the streams. In some examples, the server 505 may determine a first media stream of the plurality of media streams that includes a first delay. In some examples, the first delay may be a smallest delay of the delays of the plurality of media streams. In some examples, the server 505 may adjust a timing of one or more of the plurality of media streams based at least in part on the first delay of the first media stream.

At 535, the server 505 may transmit, to the plurality of clients 510, an instruction to reproduce a temporal reference signal at each of the clients 510. In some examples, the server 505 may synchronize reproduction of the temporal reference signal at each of the clients 510. In some examples, the temporal reference signal may be a click track, a backing track, or a combination thereof. At 540, the server 505 may re-encode the plurality of media streams into a combined stream. At 545, the server 505 may transmit the combined stream to a streaming service.

Figure 6:
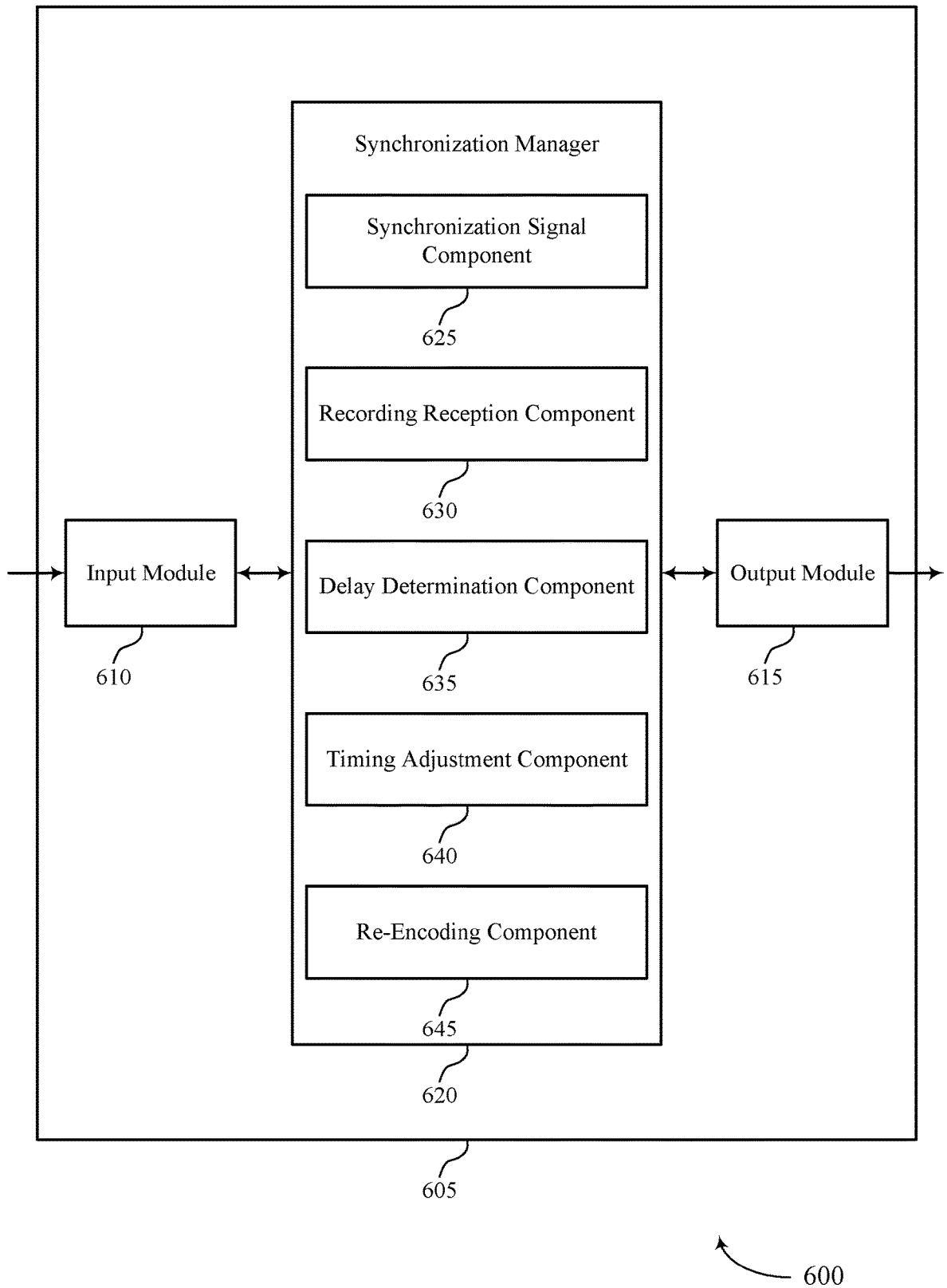
FIG. 6 shows a block diagram of an apparatus that supports synchronization of live streams from web-based clients in accordance with aspects of the present disclosure.

FIG. 6 shows a block diagram 600 of a device 605 that supports synchronization of live streams from web-based clients in accordance with aspects of the present disclosure. The device 605 may include an input module 610, an output module 615, and a synchronization manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the synchronization manager 620 to support synchronization of live streams from web-based clients. In some cases, the input module 610 may be a component of an I/O controller 810 as described with reference to FIG. 8.

The output module 615 may manage output signals for the device 605. For example, the output module 615 may receive signals from other components of the device 605, such as the synchronization manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the synchronization manager 620 may include a synchronization signal component 625, a recording reception component 630, a delay determination component 635, a timing adjustment component 640, a re-encoding component 645, or any combination thereof. In some examples, the synchronization manager 620, or various components thereof, may be configured to perform various operations (e.g., receiving, monitoring, transmitting) using or otherwise in cooperation with the input module 610, the output module 615, or both. For example, the synchronization manager 620 may receive information from the input module 610, send information to the output module 615, or be integrated in combination with the input module 610, the output module 615, or both to receive information, transmit information, or perform various other operations as described herein.

The synchronization manager 620 may support media stream synchronization at an application server in accordance with examples as disclosed herein. The synchronization signal component 625 may be configured as or otherwise support a means for transmitting, to a plurality of clients broadcasting a plurality of media streams, an instruction to reproduce a synchronization signal. The recording reception component 630 may be configured as or otherwise support a means for receiving, via the plurality of media streams, a plurality of recordings of the synchronization signal. The delay determination component 635 may be configured as or otherwise support a means for determining one or more delays associated with the plurality of media streams based at least in part on the plurality of recordings of the synchronization signal. The timing adjustment component 640 may be configured as or otherwise support a means for adjusting a timing of one or more of the plurality of media streams to synchronize the plurality of media streams, the adjusting based at least in part on the received plurality of recordings and the determined one or more delays. The re-encoding component 645 may be configured as or otherwise support a means for re-encoding the plurality of media streams into a combined stream.

Figure 7:
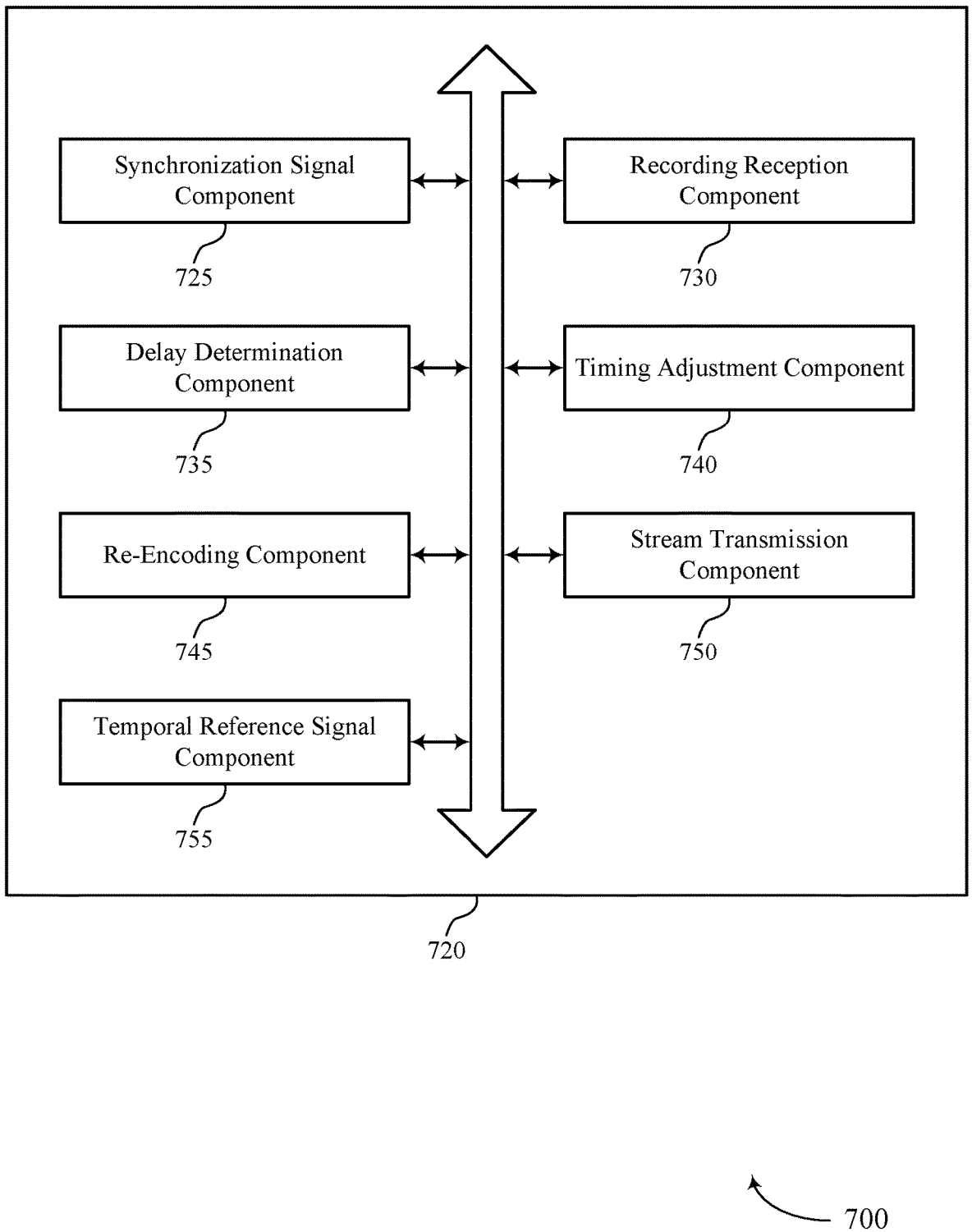
FIG. 7 shows a block diagram of a synchronization manager that supports synchronization of live streams from web-based clients in accordance with aspects of the present disclosure.

FIG. 7 shows a block diagram 700 of a synchronization manager 720 that supports synchronization of live streams from web-based clients in accordance with aspects of the present disclosure. The synchronization manager 720 may be an example of aspects of a synchronization manager or a synchronization manager 620, or both, as described herein. The synchronization manager 720, or various components thereof, may be an example of means for performing various aspects of synchronization of live streams from web-based clients as described herein. For example, the synchronization manager 720 may include a synchronization signal component 725, a recording reception component 730, a delay determination component 735, a timing adjustment component 740, a re-encoding component 745, a stream transmission component 750, a temporal reference signal component 755, or any combination thereof. Each of these components may communicate, directly or indirectly, with one another (e.g., via one or more buses).

The synchronization manager 720 may support media stream synchronization at an application server in accordance with examples as disclosed herein. The synchronization signal component 725 may be configured as or otherwise support a means for transmitting, to a plurality of clients broadcasting a plurality of media streams, an instruction to reproduce a synchronization signal. The recording reception component 730 may be configured as or otherwise support a means for receiving, via the plurality of media streams, a plurality of recordings of the synchronization signal. The delay determination component 735 may be configured as or otherwise support a means for determining one or more delays associated with the plurality of media streams based at least in part on the plurality of recordings of the synchronization signal. The timing adjustment component 740 may be configured as or otherwise support a means for adjusting a timing of one or more of the plurality of media streams to synchronize the plurality of media streams, the adjusting based at least in part on the received plurality of recordings and the determined one or more delays. The re-encoding component 745 may be configured as or otherwise support a means for re-encoding the plurality of media streams into a combined stream.

In some examples, the stream transmission component 750 may be configured as or otherwise support a means for transmitting the combined stream to a streaming service. In some examples, to support synchronization signal, the synchronization signal component 725 may be configured as or otherwise support a means for a modulated pseudo-random periodic signal with an auto-correlation peak.

In some examples, to support determining one or more delays associated with the plurality of media streams, the delay determination component 735 may be configured as or otherwise support a means for performing a cross-correlation operation between the synchronization signal and one of the plurality of recordings of the synchronization signal to produce a cross-correlation. In some examples, to support determining one or more delays associated with the plurality of media streams, the delay determination component 735 may be configured as or otherwise support a means for determining a location of a peak of the cross-correlation relative to a location of the auto-correlation peak.

In some examples, to support adjusting a timing of one or more of the plurality of media streams to synchronize the plurality of media streams, the timing adjustment component 740 may be configured as or otherwise support a means for determining a first media stream of the plurality of media streams that comprises a first delay. In some examples, to support adjusting a timing of one or more of the plurality of media streams to synchronize the plurality of media streams, the timing adjustment component 740 may be configured as or otherwise support a means for adjusting a timing of one or more of the plurality of media streams based at least in part on the first delay of the first media stream. In some examples, the first delay comprises a smallest delay of the delays of the plurality of media streams.

In some examples, the temporal reference signal component 755 may be configured as or otherwise support a means for transmitting, to the plurality of clients, an instruction to reproduce a temporal reference signal at each of the clients. In some examples, the temporal reference signal component 755 may be configured as or otherwise support a means for synchronizing reproduction of the temporal reference signal at each of the clients.

In some examples, the temporal reference signal comprises a click track, a backing track, or a combination thereof. In some examples, to support transmitting an instruction to reproduce the synchronization signal, the synchronization signal component 725 may be configured as or otherwise support a means for synchronizing reproduction of the synchronization signal at each of the clients.

In some examples, the plurality of clients are distributed across a public network and connected to the application server via the public network. In some examples, the one or more delays are attributable to latency present in the public network, a processing delay at each of the clients, or a combination thereof.

Figure 8:
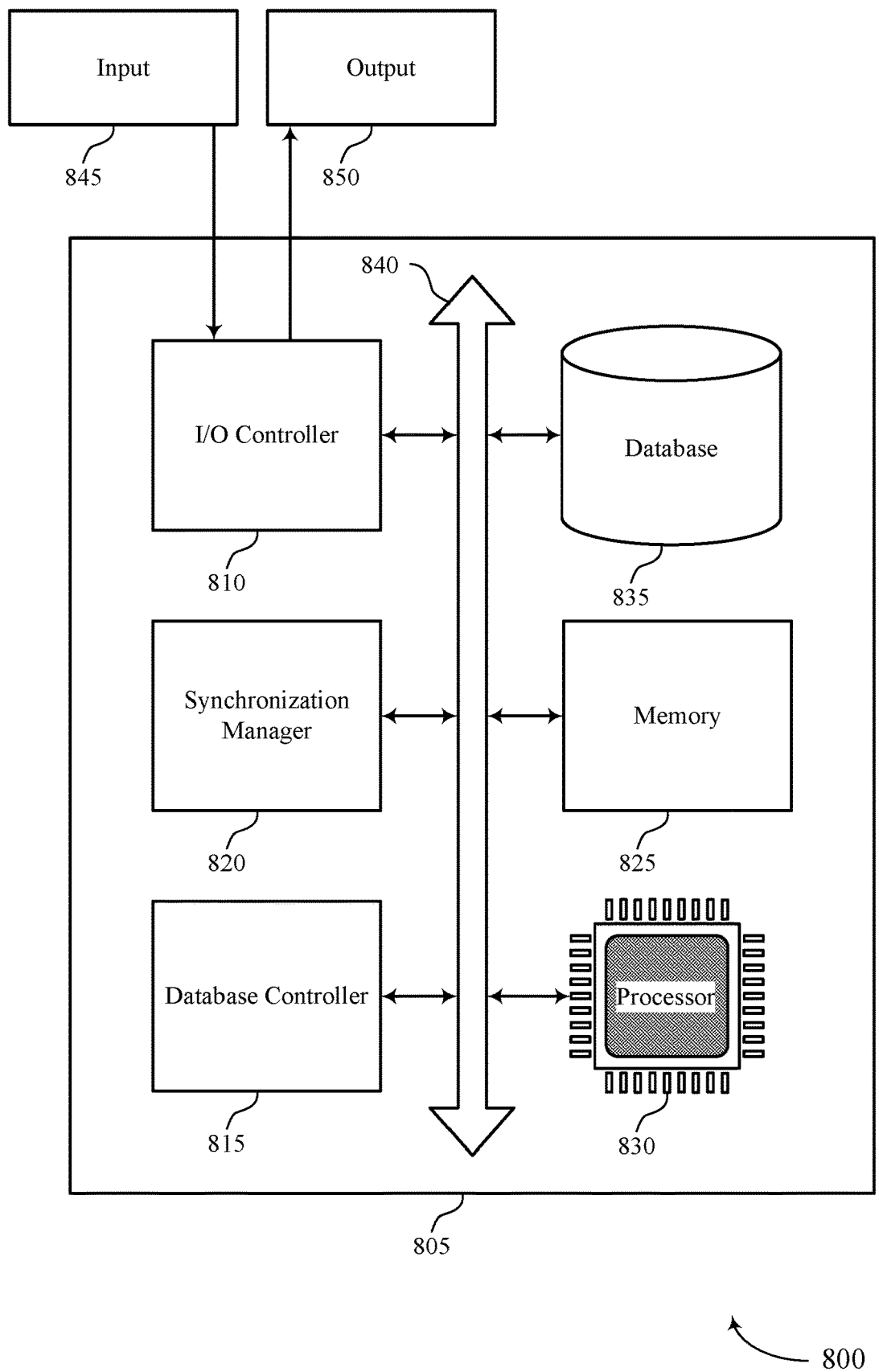
FIG. 8 shows a diagram of a system including a device that supports synchronization of live streams from web-based clients in accordance with aspects of the present disclosure.

FIG. 8 shows a diagram of a system 800 including a device 805 that supports synchronization of live streams from web-based clients in accordance with aspects of the present disclosure. The device 805 may be an example of or include the components of a device 605 as described herein. The device 805 may include components for bi-directional data communications including components for transmitting and receiving communications, such as a synchronization manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting synchronization of live streams from web-based clients).

The synchronization manager 820 may support media stream synchronization at an application server in accordance with examples as disclosed herein. For example, the synchronization manager 820 may be configured as or otherwise support a means for transmitting, to a plurality of clients broadcasting a plurality of media streams, an instruction to reproduce a synchronization signal. The synchronization manager 820 may be configured as or otherwise support a means for receiving, via the plurality of media streams, a plurality of recordings of the synchronization signal. The synchronization manager 820 may be configured as or otherwise support a means for determining one or more delays associated with the plurality of media streams based at least in part on the plurality of recordings of the synchronization signal. The synchronization manager 820 may be configured as or otherwise support a means for adjusting a timing of one or more of the plurality of media streams to synchronize the plurality of media streams, the adjusting based at least in part on the received plurality of recordings and the determined one or more delays. The synchronization manager 820 may be configured as or otherwise support a means for re-encoding the plurality of media streams into a combined stream.

By including or configuring the synchronization manager 820 in accordance with examples as described herein, the device 805 may support techniques for improved synchronization, improved communication reliability, reduced latency, improved user experience related to reduced processing or reduced latency, more efficient utilization of communication resources, improved coordination between devices, longer battery life, or improved utilization of processing capability.

Figure 9:
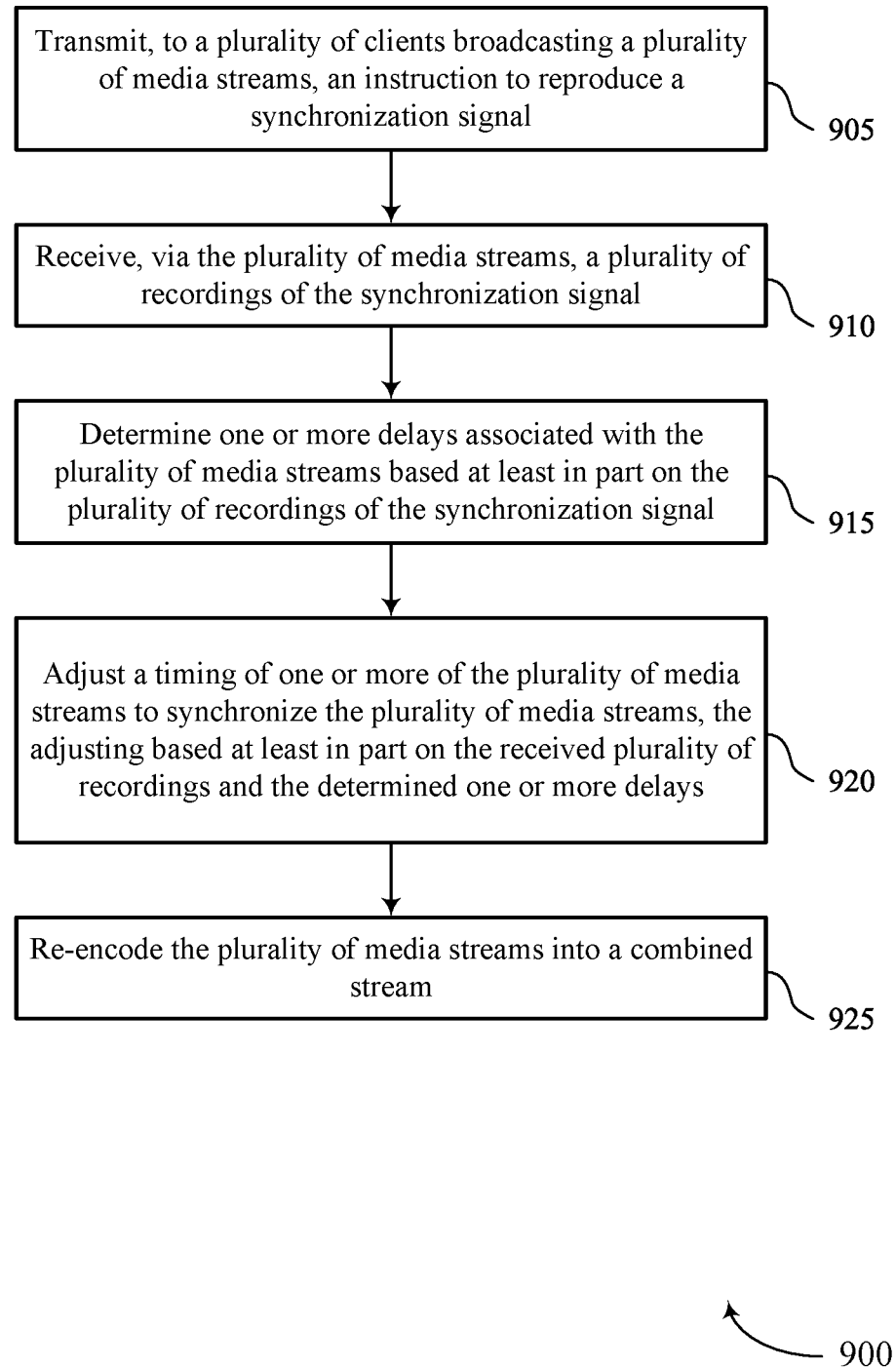
FIGS. 9 through 11 show flowcharts illustrating methods that support synchronization of live streams from web-based clients in accordance with aspects of the present disclosure.

FIG. 9 shows a flowchart illustrating a method 900 that supports synchronization of live streams from web-based clients in accordance with aspects of the present disclosure. The operations of the method 900 may be implemented by a synchronization manager or its components as described herein. For example, the operations of the method 900 may be performed by a synchronization manager as described with reference to FIGs. FIG. 1 through 8. In some examples, a synchronization manager may execute a set of instructions to control the functional elements of the synchronization manager to perform the described functions. Additionally or alternatively, the synchronization manager may perform aspects of the described functions using special-purpose hardware.

At 905, the method may include transmitting, to a plurality of clients broadcasting a plurality of media streams, an instruction to reproduce a synchronization signal. The operations of 905 may be performed in accordance with examples as disclosed herein. In some examples, aspects of the operations of 905 may be performed by a synchronization signal component 725 as described with reference to FIG. 7.

At 910, the method may include receiving, via the plurality of media streams, a plurality of recordings of the synchronization signal. The operations of 910 may be performed in accordance with examples as disclosed herein. In some examples, aspects of the operations of 910 may be performed by a recording reception component 730 as described with reference to FIG. 7.

At 915, the method may include determining one or more delays associated with the plurality of media streams based at least in part on the plurality of recordings of the synchronization signal. The operations of 915 may be performed in accordance with examples as disclosed herein. In some examples, aspects of the operations of 915 may be performed by a delay determination component 735 as described with reference to FIG. 7.

At 920, the method may include adjusting a timing of one or more of the plurality of media streams to synchronize the plurality of media streams, the adjusting based at least in part on the received plurality of recordings and the determined one or more delays. The operations of 920 may be performed in accordance with examples as disclosed herein. In some examples, aspects of the operations of 920 may be performed by a timing adjustment component 740 as described with reference to FIG. 7.

At 925, the method may include re-encoding the plurality of media streams into a combined stream. The operations of 925 may be performed in accordance with examples as disclosed herein. In some examples, aspects of the operations of 925 may be performed by a re-encoding component 745 as described with reference to FIG. 7.

Figure 10:
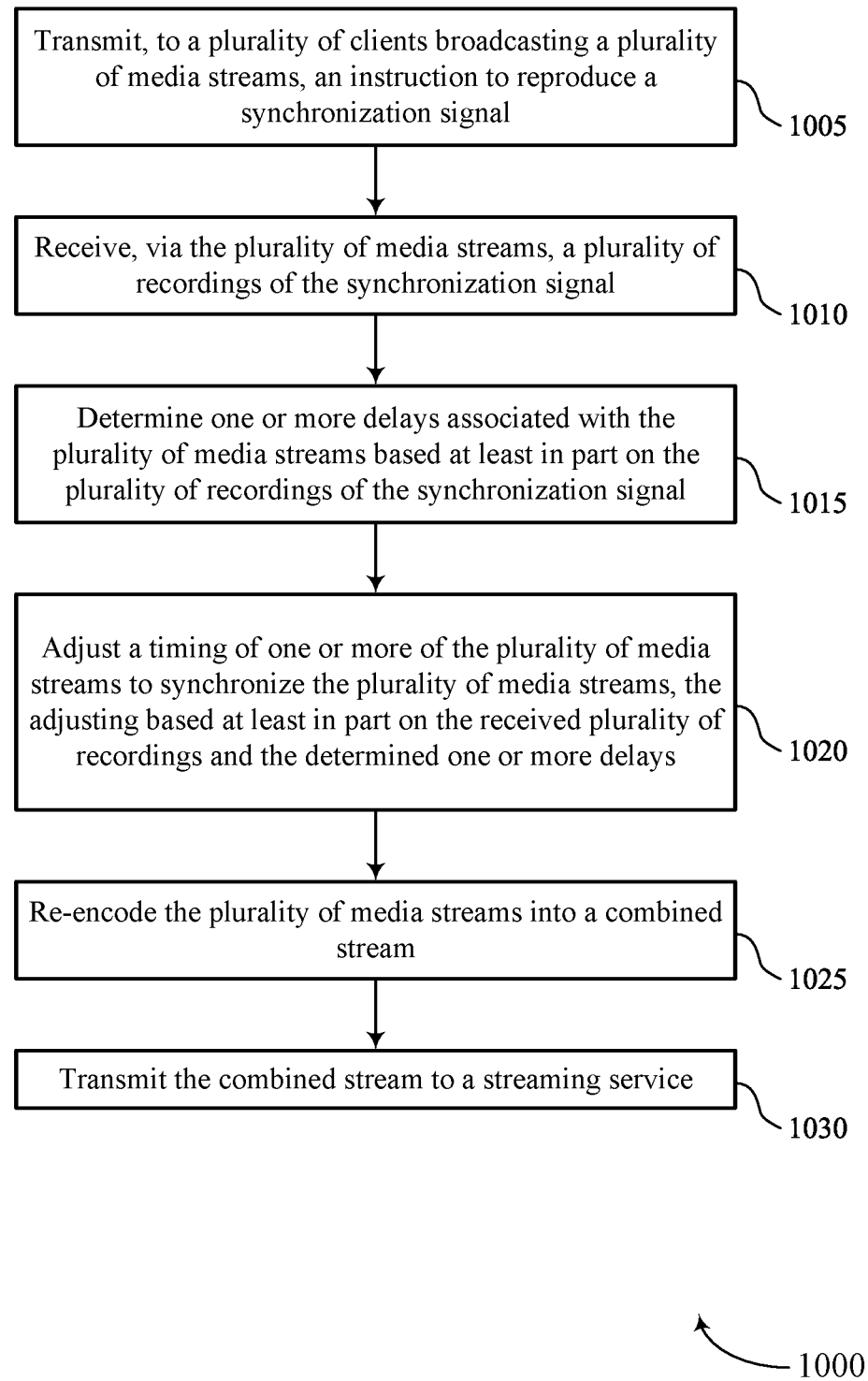

FIG. 10 shows a flowchart illustrating a method 1000 that supports synchronization of live streams from web-based clients in accordance with aspects of the present disclosure. The operations of the method 1000 may be implemented by a synchronization manager or its components as described herein. For example, the operations of the method 1000 may be performed by a synchronization manager as described with reference to FIGs. FIG. 1 through 8. In some examples, a synchronization manager may execute a set of instructions to control the functional elements of the synchronization manager to perform the described functions. Additionally or alternatively, the synchronization manager may perform aspects of the described functions using special-purpose hardware.

At 1005, the method may include transmitting, to a plurality of clients broadcasting a plurality of media streams, an instruction to reproduce a synchronization signal. The operations of 1005 may be performed in accordance with examples as disclosed herein. In some examples, aspects of the operations of 1005 may be performed by a synchronization signal component 725 as described with reference to FIG. 7.

At 1010, the method may include receiving, via the plurality of media streams, a plurality of recordings of the synchronization signal. The operations of 1010 may be performed in accordance with examples as disclosed herein. In some examples, aspects of the operations of 1010 may be performed by a recording reception component 730 as described with reference to FIG. 7.

At 1015, the method may include determining one or more delays associated with the plurality of media streams based at least in part on the plurality of recordings of the synchronization signal. The operations of 1015 may be performed in accordance with examples as disclosed herein. In some examples, aspects of the operations of 1015 may be performed by a delay determination component 735 as described with reference to FIG. 7.

At 1020, the method may include adjusting a timing of one or more of the plurality of media streams to synchronize the plurality of media streams, the adjusting based at least in part on the received plurality of recordings and the determined one or more delays. The operations of 1020 may be performed in accordance with examples as disclosed herein. In some examples, aspects of the operations of 1020 may be performed by a timing adjustment component 740 as described with reference to FIG. 7.

At 1025, the method may include re-encoding the plurality of media streams into a combined stream. The operations of 1025 may be performed in accordance with examples as disclosed herein. In some examples, aspects of the operations of 1025 may be performed by a re-encoding component 745 as described with reference to FIG. 7.

At 1030, the method may include transmitting the combined stream to a streaming service. The operations of 1030 may be performed in accordance with examples as disclosed herein. In some examples, aspects of the operations of 1030 may be performed by a stream transmission component 750 as described with reference to FIG. 7.

Figure 11:
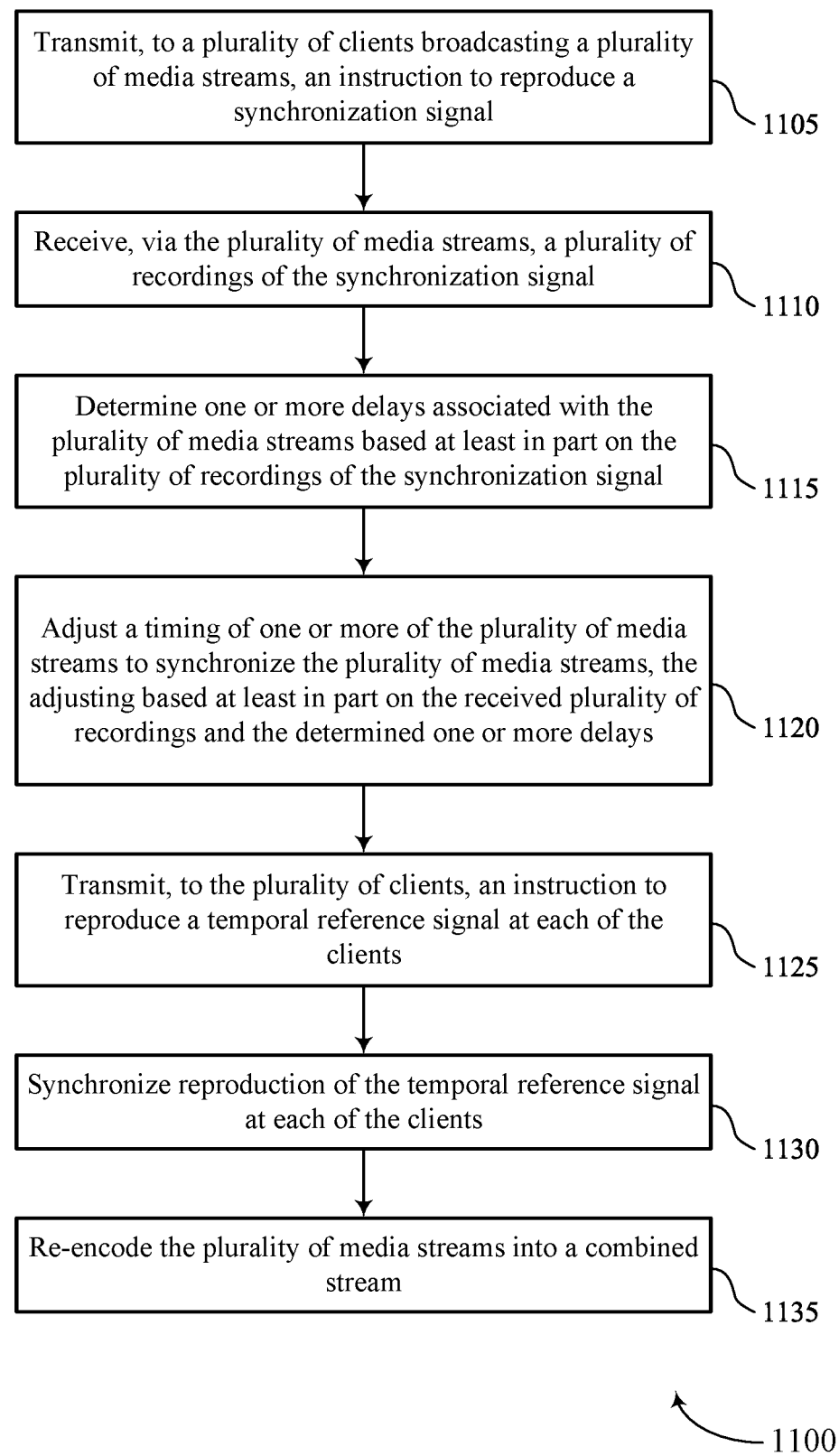

FIG. 11 shows a flowchart illustrating a method 1100 that supports synchronization of live streams from web-based clients in accordance with aspects of the present disclosure. The operations of the method 1100 may be implemented by a synchronization manager or its components as described herein. For example, the operations of the method 1100 may be performed by a synchronization manager as described with reference to FIGs. FIG. 1 through 8. In some examples, a synchronization manager may execute a set of instructions to control the functional elements of the synchronization manager to perform the described functions. Additionally or alternatively, the synchronization manager may perform aspects of the described functions using special-purpose hardware.

At 1105, the method may include transmitting, to a plurality of clients broadcasting a plurality of media streams, an instruction to reproduce a synchronization signal. The operations of 1105 may be performed in accordance with examples as disclosed herein. In some examples, aspects of the operations of 1105 may be performed by a synchronization signal component 725 as described with reference to FIG. 7.

At 1110, the method may include receiving, via the plurality of media streams, a plurality of recordings of the synchronization signal. The operations of 1110 may be performed in accordance with examples as disclosed herein. In some examples, aspects of the operations of 1110 may be performed by a recording reception component 730 as described with reference to FIG. 7.

At 1115, the method may include determining one or more delays associated with the plurality of media streams based at least in part on the plurality of recordings of the synchronization signal. The operations of 1115 may be performed in accordance with examples as disclosed herein. In some examples, aspects of the operations of 1115 may be performed by a delay determination component 735 as described with reference to FIG. 7.

At 1120, the method may include adjusting a timing of one or more of the plurality of media streams to synchronize the plurality of media streams, the adjusting based at least in part on the received plurality of recordings and the determined one or more delays. The operations of 1120 may be performed in accordance with examples as disclosed herein. In some examples, aspects of the operations of 1120 may be performed by a timing adjustment component 740 as described with reference to FIG. 7.

At 1125, the method may include transmitting, to the plurality of clients, an instruction to reproduce a temporal reference signal at each of the clients. The operations of 1125 may be performed in accordance with examples as disclosed herein. In some examples, aspects of the operations of 1125 may be performed by a temporal reference signal component 755 as described with reference to FIG. 7.

At 1130, the method may include synchronizing reproduction of the temporal reference signal at each of the clients. The operations of 1130 may be performed in accordance with examples as disclosed herein. In some examples, aspects of the operations of 1130 may be performed by a temporal reference signal component 755 as described with reference to FIG. 7.

At 1135, the method may include re-encoding the plurality of media streams into a combined stream. The operations of 1135 may be performed in accordance with examples as disclosed herein. In some examples, aspects of the operations of 1135 may be performed by a re-encoding component 745 as described with reference to FIG. 7.

A method for media stream synchronization at an application server is described. The method may include transmitting, to a plurality of clients broadcasting a plurality of media streams, an instruction to reproduce a synchronization signal, receiving, via the plurality of media streams, a plurality of recordings of the synchronization signal, determining one or more delays associated with the plurality of media streams based at least in part on the plurality of recordings of the synchronization signal, adjusting a timing of one or more of the plurality of media streams to synchronize the plurality of media streams, the adjusting based at least in part on the received plurality of recordings and the determined one or more delays, and re-encoding the plurality of media streams into a combined stream.

An apparatus for media stream synchronization at an application server is described. The apparatus may include a processor, memory coupled with the processor, and instructions stored in the memory. The instructions may be executable by the processor to cause the apparatus to transmit, to a plurality of clients broadcasting a plurality of media streams, an instruction to reproduce a synchronization signal, receive, via the plurality of media streams, a plurality of recordings of the synchronization signal, determine one or more delays associated with the plurality of media streams based at least in part on the plurality of recordings of the synchronization signal, adjust a timing of one or more of the plurality of media streams to synchronize the plurality of media streams, the adjusting based at least in part on the received plurality of recordings and the determined one or more delays, and re-encode the plurality of media streams into a combined stream.

Another apparatus for media stream synchronization at an application server is described. The apparatus may include means for transmitting, to a plurality of clients broadcasting a plurality of media streams, an instruction to reproduce a synchronization signal, means for receiving, via the plurality of media streams, a plurality of recordings of the synchronization signal, means for determining one or more delays associated with the plurality of media streams based at least in part on the plurality of recordings of the synchronization signal, means for adjusting a timing of one or more of the plurality of media streams to synchronize the plurality of media streams, the adjusting based at least in part on the received plurality of recordings and the determined one or more delays, and means for re-encoding the plurality of media streams into a combined stream.

A non-transitory computer-readable medium storing code for media stream synchronization at an application server is described. The code may include instructions executable by a processor to transmit, to a plurality of clients broadcasting a plurality of media streams, an instruction to reproduce a synchronization signal, receive, via the plurality of media streams, a plurality of recordings of the synchronization signal, determine one or more delays associated with the plurality of media streams based at least in part on the plurality of recordings of the synchronization signal, adjust a timing of one or more of the plurality of media streams to synchronize the plurality of media streams, the adjusting based at least in part on the received plurality of recordings and the determined one or more delays, and re-encode the plurality of media streams into a combined stream.

Some examples of the method, apparatuses, and non-transitory computer-readable medium described herein may further include operations, features, means, or instructions for transmitting the combined stream to a streaming service.

In some examples of the method, apparatuses, and non-transitory computer-readable medium described herein, the synchronization signal may include operations, features, means, or instructions for a modulated pseudo-random periodic signal with an auto-correlation peak.

In some examples of the method, apparatuses, and non-transitory computer-readable medium described herein, determining one or more delays associated with the plurality of media streams may include operations, features, means, or instructions for performing a cross-correlation operation between the synchronization signal and one of the plurality of recordings of the synchronization signal to produce a cross-correlation and determining a location of a peak of the cross-correlation relative to a location of the auto-correlation peak.

In some examples of the method, apparatuses, and non-transitory computer-readable medium described herein, adjusting a timing of one or more of the plurality of media streams to synchronize the plurality of media streams may include operations, features, means, or instructions for determining a first media stream of the plurality of media streams that comprises a first delay and adjusting a timing of one or more of the plurality of media streams based at least in part on the first delay of the first media stream.

In some examples of the method, apparatuses, and non-transitory computer-readable medium described herein, the first delay comprises a smallest delay of the delays of the plurality of media streams.

Some examples of the method, apparatuses, and non-transitory computer-readable medium described herein may further include operations, features, means, or instructions for transmitting, to the plurality of clients, an instruction to reproduce a temporal reference signal at each of the clients and synchronizing reproduction of the temporal reference signal at each of the clients.

In some examples of the method, apparatuses, and non-transitory computer-readable medium described herein, the temporal reference signal comprises a click track, a backing track, or a combination thereof.

In some examples of the method, apparatuses, and non-transitory computer-readable medium described herein, transmitting an instruction to reproduce the synchronization signal may include operations, features, means, or instructions for synchronizing reproduction of the synchronization signal at each of the clients.

In some examples of the method, apparatuses, and non-transitory computer-readable medium described herein, the plurality of clients may be distributed across a public network and connected to the application server via the public network.

In some examples of the method, apparatuses, and non-transitory computer-readable medium described herein, the one or more delays may be attributable to latency present in the public network, a processing delay at each of the clients, or a combination thereof.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, read-only memory (ROM), electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for media stream synchronization at an application server, comprising:
   transmitting, to a plurality of clients broadcasting a plurality of media streams, an instruction to reproduce a synchronization signal, the synchronization signal comprising a modulated pseudo-random periodic signal with an auto-correlation peak;
   receiving, via the plurality of media streams, a plurality of recordings of the synchronization signal;
   determining one or more delays associated with the plurality of media streams based at least in part on the plurality of recordings of the synchronization signal;
   adjusting a timing of one or more of the plurality of media streams to synchronize the plurality of media streams, the adjusting based at least in part on the received plurality of recordings and the determined one or more delays; and
   re-encoding the plurality of media streams into a combined stream.

2. The method of claim 1, further comprising:
   transmitting the combined stream to a streaming service.

3. The method of claim 1, wherein determining one or more delays associated with the plurality of media streams comprises:
   performing a cross-correlation operation between the synchronization signal and one of the plurality of recordings of the synchronization signal to produce a cross-correlation; and
   determining a location of a peak of the cross-correlation relative to a location of the auto-correlation peak.

4. The method of claim 1, wherein adjusting a timing of one or more of the plurality of media streams to synchronize the plurality of media streams comprises:
   determining a first media stream of the plurality of media streams that comprises a first delay; and
   adjusting a timing of one or more of the plurality of media streams based at least in part on the first delay of the first media stream.

5. The method of claim 4, wherein the first delay comprises a smallest delay of the one or more delays of the plurality of media streams.

6. The method of claim 1, further comprising:
   transmitting, to the plurality of clients, an instruction to reproduce a temporal reference signal at each of the plurality of clients; and
   synchronizing reproduction of the temporal reference signal at each of the plurality of clients.

7. The method of claim 6, wherein the temporal reference signal comprises a click track, a backing track, or a combination thereof.

8. The method of claim 1, wherein transmitting an instruction to reproduce the synchronization signal comprises:
   synchronizing reproduction of the synchronization signal at each of the plurality of clients.

9. The method of claim 1, wherein the plurality of clients are distributed across a public network and connected to the application server via the public network.

10. The method of claim 9, wherein the one or more delays are attributable to latency present in the public network, a processing delay at each of the plurality of clients, or a combination thereof.

11. An apparatus for media stream synchronization at an application server, comprising:
    a processor;
    memory coupled with the processor; and
    instructions stored in the memory and executable by the processor to cause the apparatus to:
       transmit, to a plurality of clients broadcasting a plurality of media streams, an instruction to reproduce a synchronization signal, the synchronization signal comprising a modulated pseudo-random periodic signal with an auto-correlation peak;
       receive, via the plurality of media streams, a plurality of recordings of the synchronization signal;
       determine one or more delays associated with the plurality of media streams based at least in part on the plurality of recordings of the synchronization signal;
       adjust a timing of one or more of the plurality of media streams to synchronize the plurality of media streams, the adjusting based at least in part on the received plurality of recordings and the determined one or more delays; and
       re-encode the plurality of media streams into a combined stream.

12. The apparatus of claim 11, wherein the instructions are further executable by the processor to cause the apparatus to:
    transmit the combined stream to a streaming service.

13. The apparatus of claim 11, wherein the instructions to determine one or more delays associated with the plurality of media streams are executable by the processor to cause the apparatus to:
    perform a cross-correlation operation between the synchronization signal and one of the plurality of recordings of the synchronization signal to produce a cross-correlation; and
    determine a location of a peak of the cross-correlation relative to a location of the auto-correlation peak.

14. The apparatus of claim 11, wherein the instructions to adjust a timing of one or more of the plurality of media streams to synchronize the plurality of media streams are executable by the processor to cause the apparatus to:
    determine a first media stream of the plurality of media streams that comprises a first delay; and
    adjust a timing of one or more of the plurality of media streams based at least in part on the first delay of the first media stream.

15. The apparatus of claim 11, wherein the instructions are further executable by the processor to cause the apparatus to:
    transmit, to the plurality of clients, an instruction to reproduce a temporal reference signal at each of the plurality of clients; and
    synchronize reproduction of the temporal reference signal at each of the plurality of clients.

16. The apparatus of claim 11, wherein the instructions to transmit an instruction to reproduce the synchronization signal are executable by the processor to cause the apparatus to:
    synchronize reproduction of the synchronization signal at each of the plurality of clients.

17. The apparatus of claim 11, wherein the plurality of clients are distributed across a public network and connected to the application server via the public network.

18. A non-transitory computer-readable medium storing code for media stream synchronization at an application server, the code comprising instructions executable by a processor to:
    transmit, to a plurality of clients broadcasting a plurality of media streams, an instruction to reproduce a synchronization signal, the synchronization signal comprising a modulated pseudo-random periodic signal with an auto-correlation peak;
receive, via the plurality of media streams, a plurality of recordings of the synchronization signal;
determine one or more delays associated with the plurality of media streams based at least in part on the plurality of recordings of the synchronization signal;
adjust a timing of one or more of the plurality of media streams to synchronize the plurality of media streams, the adjusting based at least in part on the received plurality of recordings and the determined one or more delays; and
re-encode the plurality of media streams into a combined stream.

* * * * *